United States Patent [19]

Lien

[11] Patent Number: 4,846,622

[45] Date of Patent: Jul. 11, 1989

[54] ADJUSTABLE SECURING MEANS FOR JOINING TWO COMPONENTS TOGETHER

[75] Inventor: Per Lien, Fredrikstad, Norway

[73] Assignee: Innotech S.A., Aldringen, Luxembourg

[21] Appl. No.: 107,266

[22] Filed: Oct. 9, 1987

[30] Foreign Application Priority Data

Oct. 17, 1986 [LU] Luxembourg ............................ 86631

[51] Int. Cl.⁴ ......................... F16B 35/00; F16B 37/02
[52] U.S. Cl. ..................................... 411/366; 411/107; 411/173; 411/182; 411/389; 411/395
[58] Field of Search ............... 411/103, 107, 172, 173, 411/182, 389, 388, 39.5, 366, 383, 410, 427, 965, 971, 970, 999, 112

[56] References Cited

U.S. PATENT DOCUMENTS

| | | | |
|---|---|---|---|
| 2,443,343 | 6/1948 | Crocker | 411/395 |
| 2,516,274 | 7/1950 | Tinnerman | 411/112 |
| 2,552,782 | 5/1951 | Hall et al. | 411/173 |
| 3,217,772 | 11/1965 | Adams | 411/112 |
| 3,424,212 | 1/1969 | Kemper | 411/410 |

Primary Examiner—Neill R. Wilson
Attorney, Agent, or Firm—Thomas S. Baker, Jr.

[57] ABSTRACT

The invention relates to an adjustable securing means, preferably of metal, for joining two components (1,2) together. It comprises a holding element (3) which can be incorporated into an adapted hole in the component (1) at the side of the component (1) facing the component (2). The holding element (3) is provided with an internal thread and comprises a collar (8). The securing means further comprises a force-transmitting element (7) which is provided at least partially with an external thread and is screwable into the holding element (3) and has a through hole (8) with a stop (a) or the like at one end, the hole (8) being otherwise completely or partially formed with polygonal cross-section. The holding element (3) consists of a relatively narrow sleeve-like ring (6). The internally threaded holding element (3) comprises a lip projecting radially from its peripheral face and axially spaced from the collar and a lug (16) which lies in the plane of the collar (8) opposite the lip (12) and has a hole (18).

4 Claims, 3 Drawing Sheets

ADJUSTABLE SECURING MEANS FOR JOINING TWO COMPONENTS TOGETHER

The present invention relates to an adjustable securing means, preferably of metal, for joining two components together, comprising a holding element which can be incorporated into an adapted hole in the component at the side of the component opposite the component, the holding element being provided with an internal thread and having a collar, a force-transmitting element which is provided at least partially with an external thread and is screwable into the holding element and a through hole having a stop or the like at one end, the hole being otherwise completely or partially shaped with polygonal cross-section and the holding element consisting of a relatively narrow sleeve-like ring.

The use of adjustable securing or mounting means, in particular for frames, windows, doors, borders or the like in corresponding breakthroughs in buildings, etc. is known. thus, Great Britain Pat. No. 1,244,498 describes a mounting or securing means by which the position of the window frame with respect to the surrounding building can be exactly set and the window frame can at the same time be secured to the building. The adjustable securing element according to this patent is characterized substantially in that it consists of a stud having an external thread which is adjustably inserted into a hole in the window frame provided with through threads. The stud provided with the thread projects out of the side face of the window frame facing the surrounding structure and when the frame is installed the stud end bears on said building structure. The stud or pin comprises a central through hole through which finally a nail is led which is then driven into the surrounding building structure. The stud and thus the window frame is thus finally secured to the surrounding structure. The hole provided with the through threads consists according to said patent simply of a threaded hole in the window frame itself or of a lining provided with an internal thread and inserted into the window frame.

It is obvious that the through holes provided with threads in a window frame as are described in Great Britain Pat. No. 1,244,498 result in a substantial weakening of the mechanical strength of the window frame in the regions of the holes. Also, it is frequently necessary to adjust window frames, etc., when they have been installed for some time. On such adjustment on turning the adjustable stud or pin very high forces arise and if the threaded hole consists of a lining as described in Great Britain Pat. No. 1,244,498 said lining will most probably tear out of its fixing at the window frame.

U.S. Pat. No. 151,383 describes a securing element which to a great extent avoids the weakening of the window frame by large through holes. This securing element also withstands high forces occurring on adjustment thereof. This securing element is of the type which includes a holding element which is incorporated in a corresponding cutout in the side face of the mounting or frame facing the building structure. From said cutout a hole of relatively small diameter leads to the opposite side face of the border or frame. The holding element comprises an internally threaded through hole. The holding element further consists of an outwardly partially threaded pressure element comprising a through hole. A screw or a similar securing means serves to secure the securing element to the building structure. The securing element is characterized substantially in that it also comprises a locking ring for securing the holding element in the frame or the like and that the inner hole of the pressure element has a stop in the lowermost portion closest to the building structure and that the hole is formed otherwise completely or partially with a polygonal cross-section.

In a particularly preferred embodiment of the securing element described in NO Pat. No. 151,383 the portion of the holding element which lies completely inside the cutout consists of a head and the locking ring surrounding the holding element is slit in the innermost region.

The pressure or thrust element, i.e. the stud provided with the external thread and the head of which bears against the face of the passage in the building, is normally secured by means of a screw to the structure, the screw head bearing on a stop which is located to such an extent inside the through inner hole of the pressure element that the portion of the hole which bears against the interior of the frame or border remains free when the screw is assembled. The last portion of the hole serves for introduction of a tool with which the pressure or thrust element can be turned and set after loosening said screw.

The securing device described in U.S. Pat. No. 151,383 requires inter alia two bores in the frame, i.e. a bore for providing said relatively narrow through hole in the frame and a second bore for providing a wide cutout for receiving said holding element with the surrounding locking ring. In addition to the two different drilling operations which have to be carried out it is clear that the wide cutout in the frame for receiving the holding element results in a certain weakening of the frame itself.

Luxembourg Pat. Ser. No. 86,251 describes a securing means which is an improvement of the securing means described in U.S. Pat. No. 151,383. In this securing means the holding element consists of a metal material and is shaped such that on installation in said through hole it automatically locks itself in the one component. By forming the holding element of metal it is therefore possible to have thin-walled dimensions such that the holding element can be introduced directly into the relatively narrow through hole in the one component. This eliminates the locking ring which is necessary according to U.S. Pat. No. 151,383. The adjustable securing means consists preferably of metal. It consists of a holding element which is incorporated into an adapted through hole in one of two components to be joined together on the side of the one component facing the other component. The holding element is provided with an internal thread. The securing means further consists of a force-transmitting element which is provided partially with an outer thread for screwing into said holding element. The force-transmitting element has a through hole which has a stop for a screw head or the like at one end and the hole can otherwise be shaped completely or partially with a polygonal cross-section. The holding element consists of a relatively narrow sleeve-like ring from which a plurality of tongue or ear-like portions project which effect a locking of the holding element in a component. The securing means is characterized substantially in that the tongue or ear-like portions have undulated edge faces and are somewhat inclined to the perpendicular centre line of said sleeve-like ring.

All the securing means outlined here cannot be used in borders, frames and the like consisting of hollow sections, in particular hollow plastic sections and hollow plastic sections reinforced with hollow metal sections, because they do not permit any stable mounting of the frame, border or the like in passages or breakthroughs of building structures.

The problem underlying the invention is to provide an adjustable securing means of the type mentioned at the beginning which is suitable for frames, borders or the like consisting of such hollow sections.

This problem is solved in that the internally threaded holding element comprises a lip radially projecting from its peripheral face and axially spaced from the collar and a lug lying in the plane of the collar opposite the lip and having a hole.

Advantageous embodiments of the securing means are described in the subsidiary claims.

The invention will now be described with the aid of the enclosed drawings, wherein.

Figure 1:
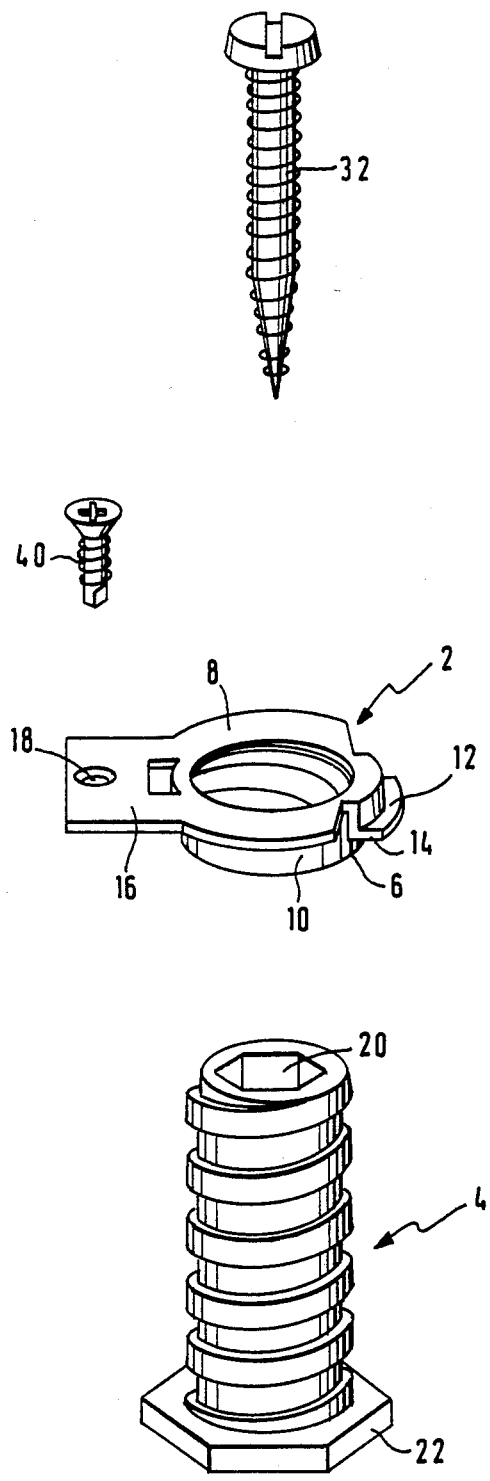
FIG. 1 is a perspective view of the two parts of the securing element itself and a screw.

FIG. 1 shows the securing means according to the invention consisting of a holding element 2 and a force-transmitting element 4. The holding element 2 consists of a sleeve-like ring having a collar 8 and a lip 12 projecting radially from the peripheral face 10 of the collar 8 and forming part of a member 14 extending from the plane of the collar 8 axially along the peripheral face 10 of the ring 6. The holding element 2 is provided with an internal thread. The collar 8 merges at the side diametrically opposite the lip 12 into a lug or tab 16 in which a hole 18 is provided. The force-transmitting element 4 has a through hole 20 which is made polygonal at least at its upper end in FIG. 1 and which at the other lower end in FIG. 1 has a likewise polygonal head 22.

Figure 2:
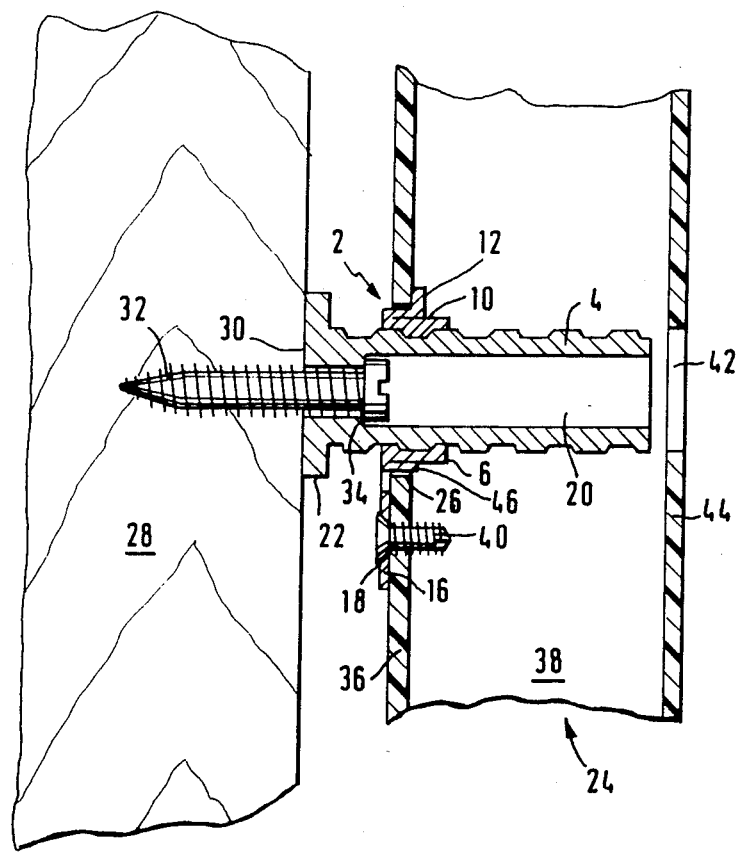
FIG. 2 shows the securing element and the screw in the completely inserted state for joining a component consisting of a plastic, hollow section to a second component.

FIG. 2 shows a securing means in the finished installed state in a component 24 consisting of a hollow section, in particular plastic hollow section. The holding element 2 is incorporated in a hole 26 in the component 24. The force-transmitting element 4 is screwed into the holding element 2 and bears with its head 22 against the second component 28. An elevated circular edge 30 engages the component 24. The force-transmitting element is fixed by means of a screw 32 to the component 28. The head of the screw 32 bears in the hole 20 of the force-transmitting element 4 on a stop 34.

On installation of the securing means into the component 24 the securing means consisting of the two parts is inserted into the drilled hole 26 in the component 24 so that the lip 12 moves beneath the section wall 36 of the hollow section 38 and the collar 8 and the lug 16 bear on the wall 36. The lug 16 is screwed to the hollow section by means of a screw 40. When the component 24 is subsequently to be joined to the component 28 rotation of the force-transmitting element 4 is necessary. On said rotation a force is transmitted to the holding element 2 and the lug 16 and screw 40 prevent the holding element being able to rotate in the hole 26. A hole 42 is provided at the section wall 44 to enable a tool to be introduced into the hole 20 of the force-transmitting element for rotation thereof. When the turning of the force-transmitting element 4 is completed the screw 32 can be screwed tight.

The lip 12 and the lug 16 with the screw 40 serve to take up the forces occurring on securing of the component 24 to the component 28 with the device according to the invention in the axial direction thereof.

Punched out of the lug 16 is a tongue 46 which is bent round against the peripheral face 10 of the ring 6. Since the hole 26 in the component 24 because of the L-shaped part 14 must be drilled somewhat greater than the diameter of the ring 6, the tongue 46 diametrically opposite the L-shaped portion 14 effects a stabilization of the holding element in the hole 26. It is perfectly conceivable for the lip to be integrally formed on the peripheral face 10; this makes the tongue 46 superfluous, at least with thin-walled hollow sections.

Figure 3:
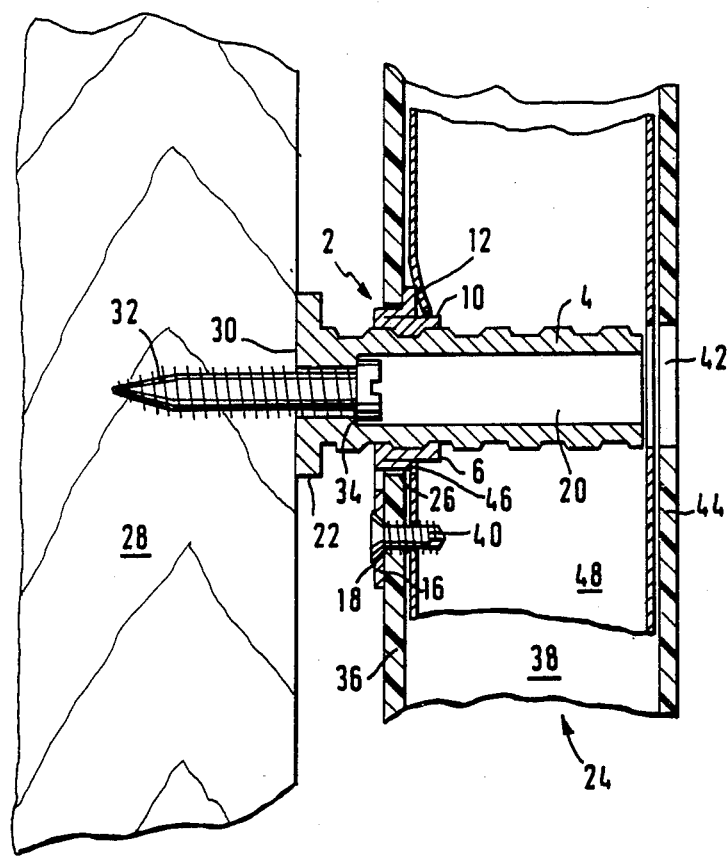
FIG. 3 shows the securing element and the screw in the finished installed state for joining a component consisting of a plastic hollow section reinforced with a metal hollow section to a second component.

With large borders, frames and the like plastic hollow sections reinforced with metal hollow sections are employed. The installation of a frame made from such a reinforced hollow section is shown in FIG. 3. FIG. 2 differs from FIG. 1 only in the hollow section 48 of metal. The screw 40 serves here simultaneously for the screwing together of metal hollow section and plastic hollow section usual with reinforced plastic hollow sections. Since there is a slight clearance between the two hollow sections the lip 12 engages between said two hollow sections.

I claim:

1. Adjustable securing means, preferably of metal, for use in joining a first component (24) to a second component (28), comprising:

a holding element (2) which can be incorporated into an adapted hole (26) in said first component (24) at the side of said first component (24) opposite said second component (28), said holding element (2) consisting of a relatively narrow sleeve-like ring (6) and being provided with an internal thread, said holding element (4) having a collar (8), a lip (12) radially projecting from the peripheral face thereof and axially spaced from the collar, and a lug (16) lying in the plane of the collar (8) opposite the lip (12) and having a hole (18), said lug (16) and said lip (12) cooperating for retaining the holding element (2) in said hole (20) in said first component; the hole (18) in said lug being adapted to receive a screw (40) to be screwed into said first component to prevent rotation of said holding element (2); and a force-transmitting element (4) being provided at least partially with an external thread and screwable into the holding element (2) to provide a spacing adjustment between the components (24 and 28) and to engage when used a surface on the side of said second element (28) opposite to the side of said first element (24) having said holding element (2) incorporated therein, said force-transmitting element (4) having a through hole (20) provided with a stop (34) at one end thereof, a portion of said through hole (20) having a non-circular cross-section; said through hole (20) and stop (34) being adapted, when in use, to respectively receive and position a screw (32) to be screwed into the second component (28).

2. Securing means according to claim 1, characterized in that the lip (12) is part of an L-shaped member (14) extending from the collar side and that a tongue (46) bent towards the peripheral face is punched out of the lug (16), said tongue being adapted for stabilizing the holding element (2) in the hole (26) in the first component (24).

3. Securing means according to claim 1, characterized in that the tongue (46) is integrally formed on the peripheral face of the holding element.

4. Securing means according to claim 1, characterized in that the L-shaped is integrally formed on the peripheral face of the holding element.

* * * * *